Jan. 26, 1943.　　　　J. BERRITTA　　　　2,309,495
CHUCK
Filed May 6, 1940　　　　2 Sheets-Sheet 1
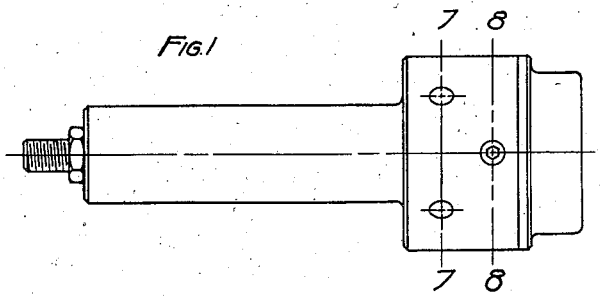
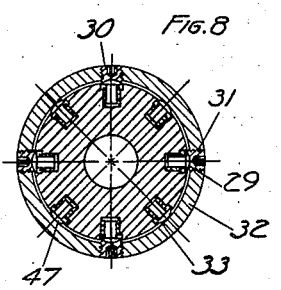
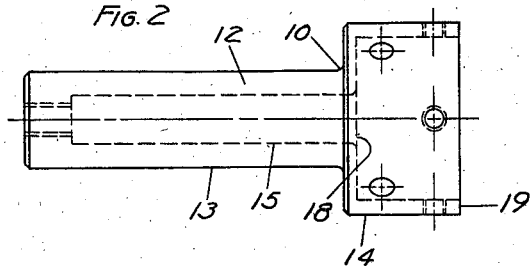
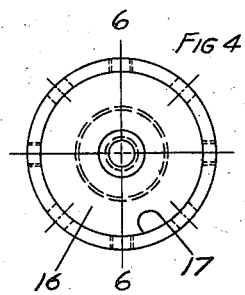
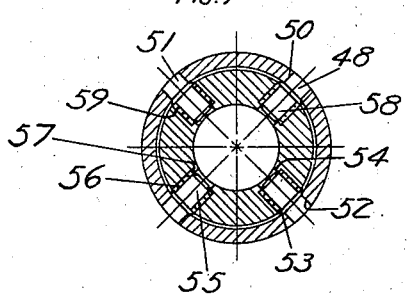
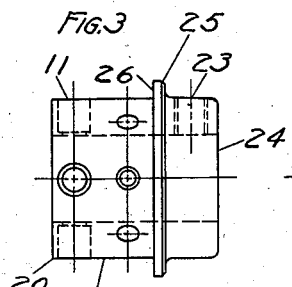
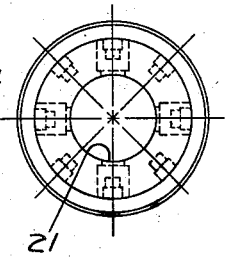
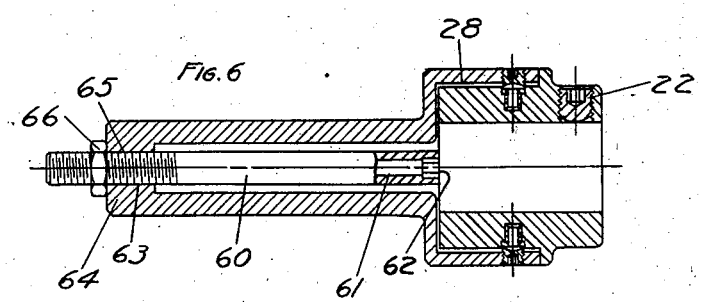
INVENTOR
James Berritta
BY Louis M. Schmidt
ATTORNEY.

Jan. 26, 1943. J. BERRITTA 2,309,495
CHUCK
Filed May 6, 1940 2 Sheets-Sheet 2
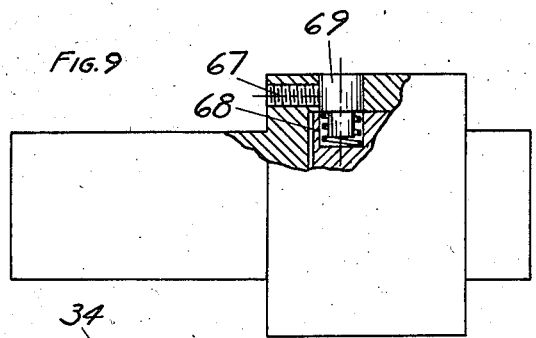
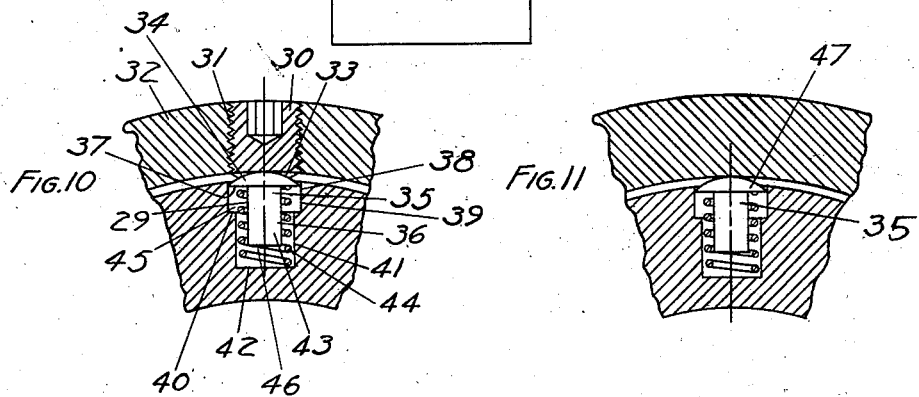
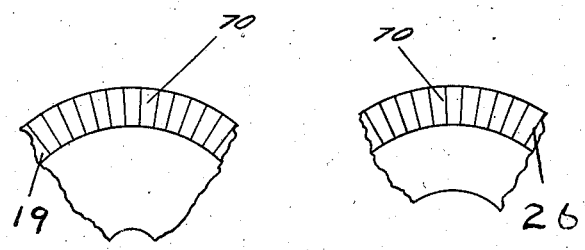
INVENTOR,
James Berritta
BY Louis M. Schmidt
ATTORNEY.

Patented Jan. 26, 1943

2,309,495

UNITED STATES PATENT OFFICE 2,309,495

CHUCK

James Berritta, New Britain, Conn.

Application May 6, 1940, Serial No. 333,447

20 Claims. (Cl. 279—16)

My invention relates to improvements in chucks of the general form and operative in substantially the same field of operations as the chuck for drills, reamers and taps that is shown in the application filed by myself under date of May 1,1939, Serial No. 270,981, and the object of the present improvement is to produce a chuck that is adapted for use with either drills, reamers, or taps in a superior manner in that it will remain for a longer period in the same degree of efficiency under hard driving conditions and the like.

In the accompanying drawings:

Figure 1 is a side elevation of my improved chuck.

Fig. 2 is a similar view of the shank member.

Fig. 3 is a similar view of the tool member.

Fig. 4 is an end elevation of the shank member.

Fig. 5 is an end elevation of the tool member.

Fig. 6 is a sectional view of the entire chuck structure on the line 6—6 of Fig. 4.

Fig. 7 is a sectional view on the line 7—7 of Fig. 1.

Fig. 8 is a sectional view on the line 8—8 of Fig. 1.

Fig. 9 is a side elevation that is in part broken away so as to show a modification of one of the features of the structure of Fig. 1.

Fig. 10 is an enlarged fragmentary broken out view showing one of the rigid clamping devices.

Fig. 11 is a similar view of one of the yielding pressure devices.

Fig. 12 shows parts of the two cooperating end faces, showing the cross-lines.

My improved chuck comprises a shank member 10 and a tool member 11 that are provided with means for cooperating one with the other so that they can be rigidly set relatively for use in operating a drill in proper alignment with the work and which means can be released from such rigid condition for cooperating in effecting a floating condition of operation.

The shank member 10 is provided with a shank 12 that serves as the supporting means, having the usual cylindrical form for the exterior 13 and said shank 12 merges with an enlarged head 14 that constitutes the other end of the shank member. An axial opening 15 extends through the shank 12 and opens into a larger opening 16 in the head 14, the latter having a cylindrical border face 17 and an annular bottom 18 and also an annular end face 19.

The tool member 11 is operatively supported from the head 14 by its inner end portion 20, is provided with a tool receiving opening 21, has tool clamping means in the form of a screw 22 that is entered in the radial screw-threaded opening 23 in the end annular collar 24 that is integral with the inner end portion 20. The junction of the two end portions comprises a radial flange 25 that has on the inner side a radial annular end face 26.

Under conditions of use the end faces 19 and 26 are operatively opposed one to the other and have sliding engagement. The two cylindrical walls or faces 17 and 27, the latter being the border wall or face of cylindrical form or periphery of the inner end portion 20 of the tool member 11, are likewise opposed one to the other. Said cylindrical faces 17 and 27 are, however, separated positively one from the other by a clearance space 28 that is relatively small though sufficient to provide for the desired floating condition of operation. The space 28 is bridged by devices 29 that are constructed and arranged so as to permit of limited relative movement of the opposed elements for effecting a proper alignment of the drill with the work and a final clamping of the parts in such adjusted position, such clamping being effected by a clamping screw 30. There are four of the clamping devices 29, distributed at 90 degree intervals.

The clamping screw 30 engages with the radial opening 31 by means of cooperating screw-threads, said opening 31 projecting through or across the wall 32 of the head 14. The inner end of the screw 30 is provided with a rounded concave seat 33 that serves as the seat for the rounded head 34 of the clamping pin 35. The pin shank 36 projects inwardly from the head 34 axially and the junction comprises an overhanging shoulder 37.

The pin 35 is generally operatively housed within a well 38 that extends radially inwardly from the outer face 27 of the inner end portion or shell 20 of the tool member; has an outer portion 39 that is an operative fit for the pin head 34 and extends as far as an annular shoulder 40 against which the said head may be seated; has an inner portion 41 of smaller diameter though larger than the pin shank 36; and has a bottom 42 against which the pin shank end 43 may be seated. A spring 44 encloses the pin shank and tends to thrust the pin outward, the ends respectively abutting against the well bottom 42 and the pin shoulder 37.

Thus two seats are provided for the pin and such double seating is provided by accuracy of workmanship. Usually there are clearance spaces between the annular pin shoulder and flat end and the opposed well shoulder and bottom, respectively.

The said clearance spaces will thus be equal in length, respectively 45 between the shoulder and the opposed shoulder face and 46 between the pin end and the well bottom. When the clamping screws 30 are released these clearance spaces are opened and the clamping devices 29 cease to operate as clamping means and function merely as yielding pressure devices, four in number. These four, however, may not be sufficient under floating conditions. As shown, four yielding pressure devices 47 are provided, interspersed between the devices 29, at regular angular intervals, and all in the same radial plane, which plane is located adjacent the opposed contacting annular faces 19 and 26.

In construction the devices 29 and 47 differ only in that the one has the clamping screw and the other has not.

In operation, the heads of the pins 35 of the devices 29 are seated in the ends of the clamping screws and the pressure is adjustable, whereas the heads of the pins 35 of the devices 47 abut against the opposed cylindrical face provided by the head structure, with the pressure fixed.

The clamping devices 29 operate to some extent as drive devices. Main drive devices 48 are provided, four in number, angularly spaced and located in a radial plane that is located adjacent the inner ends of the head and shell, and which individually are in the form of plunger structures. The pin element thereof 50 has an outer end 51 that operatively fits in a radial opening 52 that perforates the wall of the head and is provided with a limiting shoulder 53 that abuts against the border edge at the mouth of the opening. A registering opening or well 54 extends across or through the shell wall and provides housing for the inner pin end 55 and a spring 56 by reason of two diameters and a shoulder 57. Inward from the shoulder 57 there is a relatively short length that loosely fits the pin and outward thereof is the main length of larger diameter for housing the spring with the pin enclosed.

Assembling is effected by springing the pins inwardly so as to admit the shell within the head, after which the springs push the pins outwardly into the openings in the head when brought into registration therewith.

Said larger diameter 58 encloses the spring 59, the latter abutting by its ends against the shoulder 57 and the shoulder 53, respectively. Shoulder 53 is in the form of a radial flange that projects outwardly from the body of the pin and there are two active shoulders on the opposite faces thereof, respectively, one for limiting the outward movement of the pin and the other for providing a seat for the spring.

Provision is made for the adjusting rod 60 which also acts as an oil duct by means of an axial opening 61. Said rod is of cylindrical form and of appreciable length and has at the ends shaped openings 62 for a manipulating wrench. The inner end portion 63 is screw-threaded on the exterior for any length desired to provide for a particular range of adjustment for abutting against a tool in the holder.

The inner end of the shank is provided with an end wall 64 that is provided with an axial opening 65 that is smaller in diameter than the general opening in the shank and that is screw-threaded to cooperate with the threads on the rod.

A locking nut 66 may be provided.

The modification shown in Fig. 9 is an arrangement that is adapted for chucks of smaller size, the modification being confined to details of the drive devices. Instead of a spring pressed pin a set-screw 67 is used, entered longitudinally from one of the end walls; the pin receiving opening is of cylindrical form 68; the pin head 69 fits therein and is relatively large and also of cylindrical form, any portion of the periphery being adapted to cooperate with the set screw.

In order to reduce chattering and to facilitate cooperation in driving, the opposed faces 19 and 26 are roughened by providing cross lines in each, there being radial ridges 70 separated by valleys.

The main drive is of yielding character. It serves in lieu of trunnion structures as found in other floating chucks and may be referred to as a trunnion structure. The pin element thereof operates as a trunnion pin.

I claim as my invention:

1. In a chuck, a shank member having a hollow head and a tool member having a shell that is entered into said head, said members being in spaced relation one to the other, a trunnion structure located in a radial plane adjacent the inner end of said head serving as a drive connection, and positioning means located in another radial plane adjacent the outer end of said head, said positioning means being composed of spring plunger devices housed individually in wells provided in the shell and having contact pins that are thrust outwardly, the opposed wall face of the head serving as the contact bearing for part of said pins, and another part of said pins making contact with screws, said screws being operatively housed in registering openings in the head wall.

2. A chuck comprising spaced outer and inner parts or members with radial positioning devices, said devices comprising a backing screw operatively supported by the outer part and opposed thereto a contact piece that is projected into a well in the inner part, means for double seating said contact piece comprising a head and a shank as elements of the contact piece with the walls of the well shaped to correspond and fit, the outer face of the head being opposed to the screw, the inner face being in the form of an annular shoulder bordering the shank, the end face of the shank being opposed to the well bottom, the well side wall having a shoulder of annular form opposed to the annular shoulder of the contact piece, the relatively opposed shoulders and faces in each and both cases serving as seats under screw pressure conditions.

3. A chuck comprising a shank-supported head of hollow form and a tool supporting shell entered within said head with opposed walls in spaced relation, drive means serving, as longitudinal spacing means, yielding spacing means in the form of a set of spring plunger devices distributed angularly around the axis comprising individually a spring actuated contact piece supported from the one and bearing against the other, and said contact piece consisting of a headed structure having a head that provides an annular shoulder bordering a shank, a spring enclosing said shank and seated by one end against a part of said shoulder, another part of said shoulder extending outwardly beyond said spring and adapted to serve as a movement limiting seat, the end face of said shank being adapted to serve as a seat, a well being provided for housing said contact piece and spring, and the walls of said well being shaped so as to provide cooperating seats for said head of the contact piece and contact piece shank.

4. In a chuck having a hollow head and a shell entered therein and trunnion drive means operatively connecting the same, individual elements of said means consisting of pin devices, radially disposed and having an outer end for engagement with the head and an inner end for engagement with the shell in each case, with cooperating openings being provided for each of said ends, and means for maintaining said pin devices in proper operative positions, said means comprising a flange on the pin limiting movement in one direction by abutment against the border wall of an opposed opening and a spring effecting such abutment.

5. A chuck for selective use as a floating structure for taps and reamers and as a rigid structure for drills comprising a supporting shank member having a shank at the inner end that merges with a hollow head at the outer end and a shell member that is provided with means for receiving and securing a tool that emerges from the outer end and at the inner end has a shell that enters within the opening in said head, said head and shell having opposed cylindrical walls that are separated by a floating-permitting clearance space, means for effecting cooperation of said head and shell under operating conditions consisting of two sets of devices located generally in individual radial planes comprising an inner set located near the inner ends of said head and shell and an outer set near their outer ends, said inner set comprising devices for effecting a drive connection that permits of floating operation, and said outer set comprising devices adapted for selective use for cushioning operation under floating conditions and for rigid conditions of operation.

6. A chuck as described in claim 5 in which the devices of said outer set comprise spring plunger devices that operate across said clearance space and that are individually housed in wells in the wall of the shell and comprising a spring actuated contact piece that is projected outwardly across said space, the opposed wall of the head serving to sustain contact piece pressure in all cases, part thereof directly, the wall face serving as a bearing, and part thereof indirectly through the medium of opposed backing screws that are supported by said wall.

7. A chuck as described in claim 5, said shank member being provided with an axial opening of appreciable diameter that merges with the opening in the head, a tool backing plug housed therein, and said plug being provided with an oil duct.

8. A chuck as described in claim 5, said head having a radial end face, and said shell member having a radial integral collar that has a radial face for sustaining thrust pressure under operating conditions in opposition to said face on the head.

9. A chuck as described in claim 5, said inner drive-connection set comprising as individual members double-ended plug structures having a radial flange or collar at the junction of the two ends, socket-like radial openings in the head and shell for operatively housing the two ends respectively, a spring in the socket in the shell operating against said collar driving the structure outwardly, the movement being limited by the border wall of the socket in the head.

10. A chuck as described in claim 5, the said outer set comprising spring plunger devices generally similar one to the other and housed generally in the shell, each having an outwardly projected contact piece, and dissimilar means opposed thereto, respectively the solid wall face and a screw supported by the opposed wall.

11. A chuck comprising an outer head and a shell entered within an opening in said head, the two being separated along overlapping wall faces by a floating-permitting gap, means operatively connecting said head and shell including a drive set composed of a plurality of individual members, and the said last named members comprising each a drive member proper that is in the form of a plug-structure, both end portions of which respectively serve as positive drive connecting means, the one with the head and the other with the shell, an intermediate flange or collar serving as positioning means in cooperation with a spring.

12. A chuck comprising an outer hollow head and a shell entered into the opening in said head, the two separated by a floating-permitting gap, a drive set operatively connecting said head and shell, individual members of said set comprising each a double-ended plug, a socket-like opening in said shell receiving one of the ends of said plug for effecting a drive connection, a socket-like opening in said head providing a housing for the other end of said plug and in which said other end of the plug is reciprocable, and means for operatively securing said other end of the plug in said housing.

13. In a chuck for drills, reamers and taps, a supporting member having at its outer end a hollow head and a tool holding member having at its inner end a shell that is entered within said head, the head and shell being spaced apart to permit of floating operation, an axial opening being provided throughout the structure, drive means permitting of such floating, spring plunger devices bridging the gap between the two members, comprising individually a contact piece backed by a spring, and the pressure of the fixed end of the spring being sustained by the shell and that of the contact piece being sustained by the head.

14. In a chuck for drills, reamers and taps as described in claim 13, a plurality of such contact pieces, a screw, adjustable in the head wall, serving as the direct contact means for the contact piece.

15. In a chuck for drills, reamers and taps as described in claim 13, opposed radial faces on the head and shell cooperating under pressure conditions for mutual guidance.

16. A chuck comprising an outer hollow head and a shell entered into the opening in said head, the two separated by a floating-permitting gap, a drive set operatively connecting said head and shell, individual members of said set comprising each a double-ended plug, a socket-like opening in said shell receiving one of the ends of said plug for effecting a drive connection, a socket-like opening in said head providing a housing for the other end of said plug, and means for operatively securing said other end of the plug in said housing, said means comprising an annular collar-like enlargement of the plug structure at the junction of the two plug ends that is adapted to make bearing contact against the border walls of said socket-like opening in the head and a spring encircling the plug end that is receiving in the socket-like opening in the shell and operates to effect such bearing contact engagement.

17. A chuck comprising an outer hollow head and a shell entered into the opening in said head, the two separated by a floating-permitting gap, a drive set operatively connecting said head and shell, individual members of said set comprising each a double ended plug, a socket-like opening in said shell receiving one of the ends of said plug for effecting a drive connection, a socket-like opening in said head providing a housing for the other end of said plug, and means for operatively securing said other end of said plug in the housing, said means being in the form of a set-screw that is entered longitudinally along the body of the head and engages by its contact end with said other end of the plug.

18. A chuck having a hollow head and a shell entered within the opening therein, a supporting shank projected inwardly from said head, and means for securing an outwardly projected tool from said shell, opposing faces of said head and shell being spaced one from the other to permit of floating operation, drive means comprising a set of plunger devices having individual drive pins that radiate from said shell as from a hub and projected by their outer ends into sockets provided therefor in the head, and means for limiting such outward projection of the pins.

19. A chuck as described in claim 18, individual spring means operating to project said pins outwardly, said pin-limiting means being in the form of an integral collar on the pin in abutment with the border edge of the pin-end-receiving socket.

20. A chuck as described in claim 18, said pin-limiting means being in the form of a set-screw in the head engaged with the pin end.

JAMES BERRITTA.